(12) United States Patent
Yu et al.

(10) Patent No.: US 11,977,662 B2
(45) Date of Patent: May 7, 2024

(54) ONE-TIME PROGRAMMABLE FEATURES FOR STORAGE DEVICES

(71) Applicant: Dell Products, L.P., Round Rock, TX (US)

(72) Inventors: Frank Widjaja Yu, Austin, TX (US); Jonathan Jay Kellen, Dassel, MN (US); Gregory M. Allen, Layton, UT (US)

(73) Assignee: Dell Products, L.P., Round Rock, TX (US)

( * ) Notice: Subject to any disclaimer, the term of this patent is extended or adjusted under 35 U.S.C. 154(b) by 348 days.

(21) Appl. No.: 16/863,668

(22) Filed: Apr. 30, 2020

(65) Prior Publication Data
US 2021/0342487 A1 Nov. 4, 2021

(51) Int. Cl.
*G06F 21/74* (2013.01)
*G06F 3/06* (2006.01)
*G06F 21/46* (2013.01)
*G06F 21/60* (2013.01)
*G06F 21/78* (2013.01)
*G11C 17/16* (2006.01)

(52) U.S. Cl.
CPC .......... *G06F 21/74* (2013.01); *G06F 3/062* (2013.01); *G06F 3/0634* (2013.01); *G06F 3/0652* (2013.01); *G06F 3/0673* (2013.01); *G06F 21/46* (2013.01); *G06F 21/602* (2013.01); *G06F 21/78* (2013.01); *G11C 17/16* (2013.01)

(58) Field of Classification Search
CPC ...... G06F 3/0659; G06F 21/79; G06F 3/0634; G06F 21/46; G06F 21/602; G06F 3/062; G06F 3/0673; G06F 3/0652; G06F 21/78; G06F 21/74; G11C 17/18; G11C 17/16
USPC .................................................. 713/193, 189
See application file for complete search history.

(56) References Cited

U.S. PATENT DOCUMENTS

| | | | | |
|---|---|---|---|---|
| 2007/0038856 A1* | 2/2007 | Ali | ......................... | G06F 21/57 713/164 |
| 2007/0174621 A1* | 7/2007 | Ducharme | .............. | G06F 21/10 713/176 |
| 2011/0087898 A1* | 4/2011 | Williams | .............. | H04L 9/3236 380/46 |
| 2011/0154060 A1* | 6/2011 | Guyot | ................... | H04L 9/0894 713/193 |
| 2011/0222330 A1* | 9/2011 | Lee | ..................... | G11C 13/0004 365/100 |
| 2011/0307709 A1* | 12/2011 | Cox | ........................ | G06F 21/80 713/193 |

(Continued)

*Primary Examiner* — David Yi
*Assistant Examiner* — Zubair Ahmed
(74) *Attorney, Agent, or Firm* — Fogarty LLP

(57) ABSTRACT

Systems and methods are provided for implementing one-time programmable features for storage devices. In some embodiments, an Information Handling System (IHS) may include: a processor; and a memory coupled to the processor, the memory having program instructions stored thereon that, upon execution, cause the IHS to: initialize a one-time programmable (OTP) security storage device; and transmit a command to the OTP security storage device, where the OTP security device is configured to be set in security or non-security mode in response to the command, and where the OTP security storage device is configured to deny or ignore any subsequent command to set the OTP security storage device in a security mode or a non-security mode.

15 Claims, 3 Drawing Sheets

(56) References Cited

U.S. PATENT DOCUMENTS

| | | | | |
|---|---|---|---|---|
| 2012/0254602 A1* | 10/2012 | Bhansali | ............ | G06F 21/31 |
| | | | | 713/2 |
| 2014/0201607 A1* | 7/2014 | Ashkenazi | ............ | G06F 21/71 |
| | | | | 714/819 |
| 2017/0091123 A1* | 3/2017 | Sato | ............ | G06F 21/6209 |
| 2019/0347391 A1* | 11/2019 | Kim | ............ | G06F 21/32 |
| 2021/0117546 A1* | 4/2021 | Finchelstein | ............ | G06F 21/53 |

* cited by examiner

ONE-TIME PROGRAMMABLE FEATURES FOR STORAGE DEVICES

FIELD

This disclosure relates generally to Information Handling Systems (IHSs), and more specifically, to systems and methods for implementing one-time programmable (OTP) features for storage devices.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A typical IHS includes one or more data storage devices, such as Solid State Drives (SSDs), Hard Disk Drives (HDDs), etc. As the inventors hereof have recognized, conventional storage devices come in both security type and non-security type. Moreover, some customers may require security-type drives, but certain regions of the world may not allow the import of security-type devices. As a result, at the present time, IHS manufacturers have to purchase and manage two distinct sets of inventories (i.e., security type and non-security type).

SUMMARY

Systems and methods for implementing one-time programmable features (e.g., security features, performance features, etc.) for storage devices. In an illustrative, non-limiting embodiment, an Information Handling System (IHS) may include: a processor; and a memory coupled to the processor, the memory having program instructions stored thereon that, upon execution, cause the IHS to: initialize a one-time programmable (OTP) security storage device; and transmit a command to the OTP security storage device, where the OTP security device is configured to be set in security or non-security mode in response to the command, and where the OTP security storage device is configured to deny or ignore any subsequent command to set the OTP security storage device in a security mode or a non-security mode.

To deny or ignore any subsequent command, the OTP security storage device may be configured with a secure memory area reserved to store information about whether the OTP security storage device is in the security mode or the non-security mode. The secure memory area may not be directly accessible by the processor. Additionally, or alternatively, to deny or ignore any subsequent command, the OTP security storage device may be configured with one-time fusible link. The command may include an instruction to set the OTP security storage device as a Trusted Computing Group Secure Encrypting Drive (TCG-SED) or as an Instant Secure Erase (ISE) drive.

The OTP security storage device may be configured to exclude at least one security instruction from a list of processable instructions in response to the command setting the OTP security storage device in the non-security mode. Additionally, or alternatively, the command may include an instruction to change a secure identification (SID) personal identification number (PIN) of the OTP security storage device, and the OTP security storage device may be configured to be set in the security mode in response to the command.

The program instructions, upon execution, may cause the IHS to: transmit a discovery command to the OTP security storage device; and in response to the transmission, receive: (a) an indication of whether the OTP security storage device supports the security and non-security modes, (b) a current programming state of the OTP security storage device, and (c) a current security state of the OTP security storage device. The program instructions, upon execution, may also cause the IHS to, in response to the transmission, receive: (d) an indication of how the OTP drive was programmed.

In another illustrative, non-limiting embodiment, a memory storage device may have program instructions stored thereon that, upon execution by a controller of an OTP security storage device, cause the OTP security storage device to: receive a command from an IHS; and enter a security mode or a non-security mode in response to the command.

In yet another illustrative, non-limiting embodiment, a method may include: receiving, at a drive controller, a command issued by a processor of an IHS; setting a storage device coupled to the drive controller in a mode of operation identified in the command; and automatically denying or ignoring any subsequent command to set the storage device in a different mode operation. The command may include an instruction to change a SID personal identification number PIN of the storage device, and the storage device may be configured to be set in the security mode in response to the command. The method may also include: receiving a discovery command from the IHS; and in response to the discovery command, transmitting to the IHS at least one of: (a) an indication of whether the storage device supports the mode and the other mode, (b) a current mode of the storage device, or (c) an indication of how the storage device was programmed.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
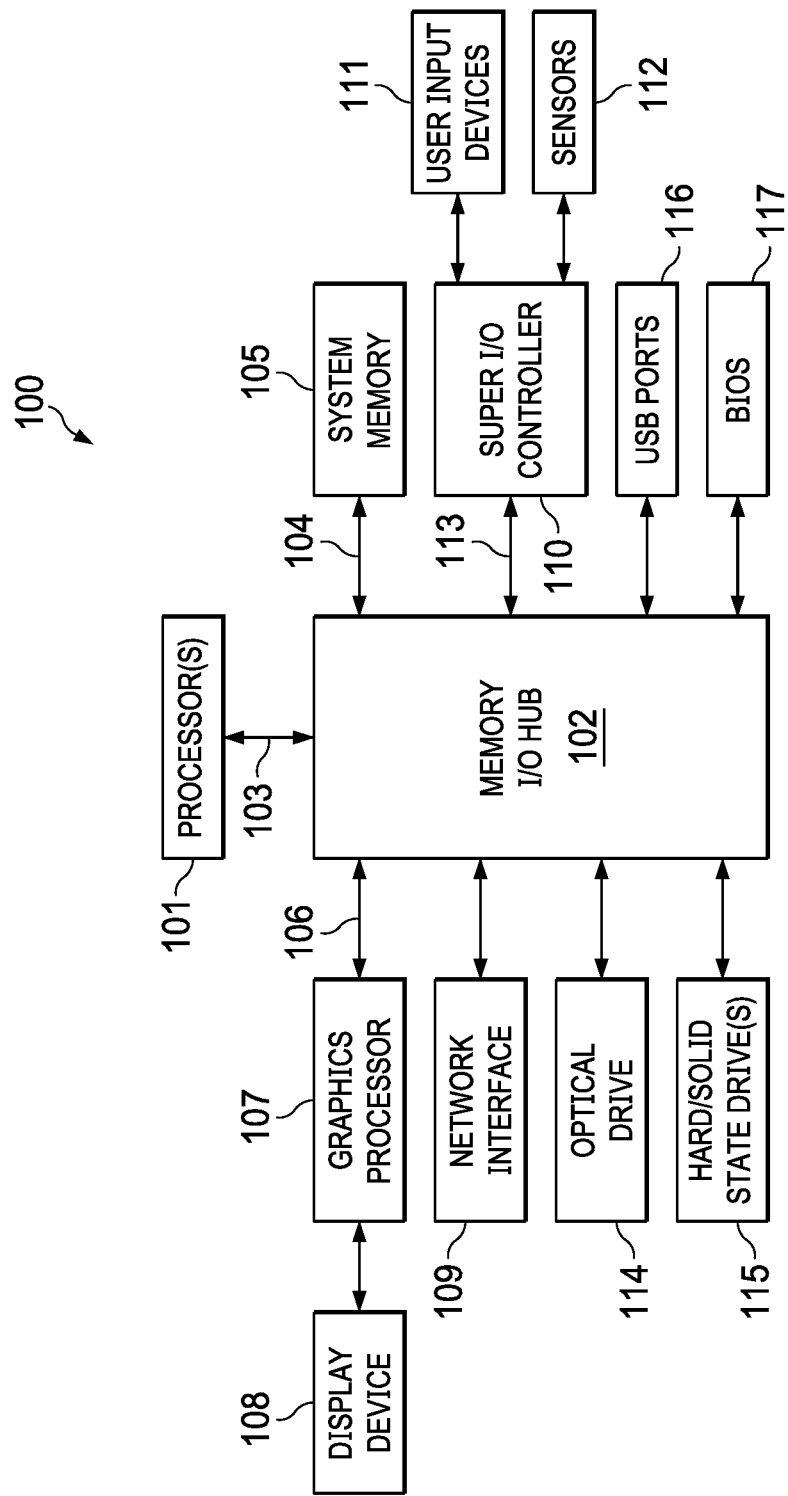
FIG. 1 is a block diagram illustrating an example of components of an Information Handling System (IHS), according to some embodiments.

In some embodiments, systems and methods described herein may allow the purchase of a single type of storage device by an Information Handling System (IHS) manufacturer. Each such storage device may be capable of operating in two or more modes.

For example, in a security context, security-type devices may include hardware-based full disk encryption (FDE) devices, such as self-encrypting drives (SED), whereas non-security type devices may exclude FDE/SED devices. Using the systems and methods described herein, the same storage device received from a drive manufacturer may be configured or customized one time during an IHS manufacturer's build process to be either security or non-security type, depending upon customer and/or regional compliance requirements. As such, in various implementations, purchasing complexity and inventory carrying costs may be reduced.

Still referring to the security context, a storage device as described herein may include a secure memory storing firmware executable by a controller. A special area of the secure memory may be reserved to include information about whether or not the security features (TCG) should remain or be disabled. This special area of memory remains secure, in that the firmware algorithms do not allow a host processor direct access to the memory, but only access according to the methods described herein. Moreover, the firmware algorithm may allow the host processor to select the security feature only once (i.e., One-Time Programmable (OTP) security). In other cases, however, systems and methods described herein may be implemented using a one-time fusible link, instead or independently of the secure memory.

In other embodiments, systems and methods described herein may be used to allow the one-time programming of any type of storage device having two or more different modes of operation, features, or functionality. For example, outside of the security context, certain types of storage devices may include normal and throttle performance modes. In IHS configurations with large numbers of drives or fan limitations (i.e., drives are subject to high temperatures), each drive may be one-time programmed to always operate in throttled performance mode from that point on. More generally, the systems and methods described herein may be used to one-time program any feature, behavior, protocol, etc. that an IHS manufacturer may wish to select (e.g., from a set or two or more features), configure (e.g., set a value or a range of values), or remove permanently from a storage device.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 shows an example of components of IHS 100 configured to implement the systems and methods described herein according to certain embodiments. It should be appreciated that although certain implementations described herein are discussed in the context of a server computer or personal computer (e.g., laptop, desktop, tablet, etc.), other IHS implementations may be utilized.

Particularly, IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a memory I/O hub chipset 102 comprising one or more integrated circuits that connect to processor(s) 101 over a front-side bus 103. Memory I/O hub 102 provides the processor(s) 101 with access to a variety of resources. For instance, memory I/O hub 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Memory I/O hub 102 may also provide access to graphics processor 107. In certain embodiments, graphics processor 107 may be comprised within one or more video or graphics cards that have been installed on IHS 100. Graphics processor 107 may be coupled to memory I/O hub 102 via graphics bus 106 such as provided an AGP (Accelerated Graphics Port) bus or a PCI (Peripheral Component Interconnect or) bus. In certain embodiments, graphics processor 107 generates display signals and provides them to coupled display device 108.

In certain embodiments, memory I/O hub 102 may also provide access to one or more user input devices 111. In such embodiments, memory I/O hub 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communication with one or more sensor devices 112, which may include environment sensors, such as a temperature sensor or other cooling system sensor. The I/O devices, such as user input devices 111 and sensor devices 112, may interface super I/O controller 110 through wired or wireless connections. In certain embodiments, super I/O controller 110 may be coupled via a Low Pin Count (LPC) bus 113.

Other resources may also be coupled to IHS 100 through memory I/O hub 102. In certain embodiments, memory I/O hub 102 may be coupled to network interface 109, such as provided by a Network Interface Controller (NIC). According to various embodiments, network interface 109 may support communication via various wired and/or wireless networks. Memory I/O hub 102 may also provide access to one or more hard disk and/or solid-state drives 115. In certain embodiments, access may be provided to optical drive 114 or other removable-media drive. Any or all of storage devices 114 and 115 may be integral to IHS 100, or may be located remotely from IHS 100. In certain embodiments, access may be provided to one or more Universal Serial Bus (USB) ports 116.

Another resource that may be accessed by processor(s) 101 via memory I/O hub 102 is BIOS 117. The BIOS 117 provides an abstraction layer for interfacing with certain hardware components that are utilized by IHS 100. Via this hardware abstraction layer provided by BIOS 117, the software executed by the processor(s) 101 of IHS is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. Upon booting of the IHS 100, processor(s) 101 may utilize BIOS 117 instructions to initialize and test hardware components coupled to the IHS and to load an Operating System (OS) for use by IHS 100.

Sensors 112 may provide access to data describing environmental and operating conditions of IHS 100 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 101 may be configured to use context information collected by sensors 112 to determine the relative orientation and movement of IHS 100. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, processor(s) 101 may also determine a location and movement of IHS 100 based on triangulation of network signal and based on network information provided by the OS or network interface. In some embodiments, processor(s) 101 may support additional sensors, such as optical, infrared and sonar sensors, that may provide support for xR (virtual, augmented, and/or mixed reality) sessions hosted by IHS 100 and may be used to provide an indication of a user's presence near IHS 100, such as whether a user is present, absent, and/or facing an IHS display.

In cases where an end-user is present before IHS 100, processor(s) 100 may further determine a distance of the end-user from the IHS, where this determination may be made continuously, at periodic intervals, or upon request. The detected or calculated distances may be used by processor(s) 100 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, processor(s) 100 may utilize one or more mode sensors 112 that collect readings that may be used in determining the current posture in which IHS 100 is physically configured. In certain embodiments, such posture determinations may be additionally made using the movement and orientation information provided by sensors 112.

In laptop and convertible laptop embodiments, for example, processor(s) 100 may utilize lid position sensor 112 to determine the relative angle between the two panels of the laptop in order to determine the mode in which IHS 100 is physically configured. In such embodiments, lid position sensor 112 may measure the angle of rotation of the hinge that connects the base panel and lid panel of IHS 100. In some cases, processor(s) 100 may collect lid position information, such as the hinge angle, to then use in determining the posture in which IHS 100 is configured.

Processor(s) 100 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. Processor(s) 100 may additionally utilize orientation and movement information collected from inertial movement sensors 112 to further determine the posture in which IHS 100 is physically configured. For instance, if processor(s) 100 determine that IHS 100 is configured with a hinge angle of a laptop configuration, but IHS 100 is oriented on its side, IHS 100 may be determined to be in a book mode. If IHS 100 is determined to be tilted such that the hinge is oriented between horizontal and vertical, the user's face is detected to be facing the integrated display, and IHS 100 is experiencing slight movement, processor(s) 100 may determine that IHS 100 is being used in a book posture. Processor(s) 100 may determine that IHS 100 is opened to a 180-degree hinge angle and lies on a flat surface, thus indicating that IHS 100 it is being used in a landscape posture. Processor(s) 100 may similarly determine that IHS 100 is in a tent configuration, in response to detecting a hinge angle within a defined range, such as between 300 and 345 degrees, such that the hinge is aligned horizontally and is higher than both display panels of IHS 100.

In some implementations, IHS 100 may not include each of the components shown in FIG. 1. In other implementations, IHS 100 may include other components in addition to those that are shown in FIG. 1. Furthermore, some components that are represented as separate components in FIG. 1 may instead be integrated with other components. For example, all or a portion of the functionality provided by two or more discrete components may instead be provided by components that are integrated into processor(s) 100 as a systems-on-a-chip.

Figure 2:
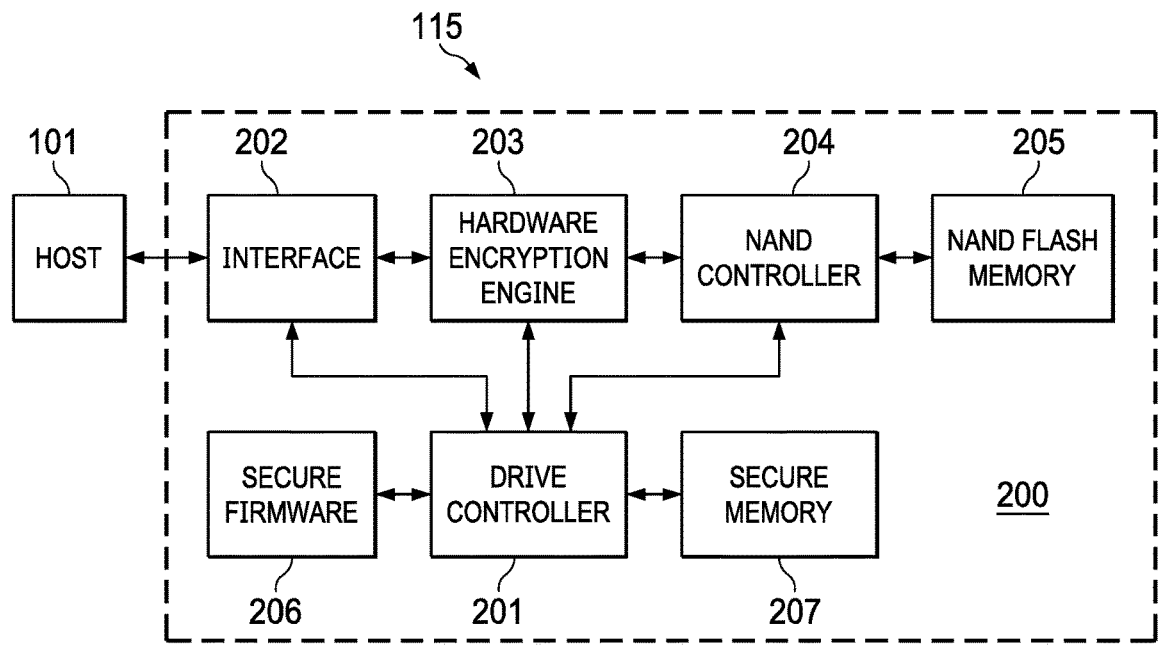
FIG. 2 is a block diagram depicting an example of components of a storage device, according to some embodiments.

FIG. 2 is a block diagram depicting an example of components 200 of storage device 115 (i.e., an "OTP security storage device"). In this embodiment, storage device 115 may be a Trusted Computing Group Secure Encrypting Drive (TCG-SED) device. In other embodiments, storage device 115 may include any other type of encryption or security functionality, not limited to TCG, that would nonetheless make storage device 115 unsuitable for importation into certain countries and regions (e.g., due to legal restrictions) and/or for use in certain industries, companies, etc.

For example, storage device 115 may be an SSD with NAND flash memory. However, it should be noted that the systems and methods described herein may be more broadly applied to other types of devices with nonvolatile memory, such as HDDs, etc.

Specifically, host processor(s) 101 are coupled to storage device 115 via memory I/O hub 102. Within storage device 115, interface 202 (e.g., SAS, SATA, NVMe, etc.) supports a given security protocol (e.g., TCG) and it may include a connector, physical layer (phy), FIFO, etc. hardware encryption engine 203 (e.g., Advanced Encryption Standard (AES)), which encrypts and decrypts data as it flows into and out of storage device 115.

NAND Controller 204 reads and writes NAND from and flash memory 205 through multiple channels and ensures data integrity. NAND flash memory 205 is where the user data and other required metadata is stored. Drive controller 201 controls all operations of the drive and it may include a microprocessor, memories, and/or other controller hardware. Secure firmware 206 includes algorithms for data storage, communication through the interface according to security protocols, and is kept secure by digital signature. Moreover, there is a special area of secure memory 207 that is kept secure for encryption key storage.

In various embodiments, both security (TCG-SED) and non-security (ISE) drives may include an AES engine to encrypt and decrypt the data via a built-in a Media Encryption Key. A non-security drive (ISE) is generally open for user access (read/write), but it is capable of Instant Secure Erase (ISE). That is, an ISE drive can crypto-erase the data via a "sanitize command" that throws away the existing Media Encryption Key and generates a new one, which remains unknown to the user. In some cases, however, non-security drives may be devoid of any security features, including ISE. Meanwhile, a security drive (TCG-SED) supports TCG protocol which allows the host to generate an encrypted locking key to prevent user access (read/write). The TCG protocol also supports TCG Crypto Erase command to crypto-erase the data by changing the Media Encryption Key. Moreover, an unconfigured security drive (TCG-SED) behaves like an ISE drive, since no locking key has been assigned.

In various embodiments, systems and methods described herein may include at least two vendor-unique commands that can be issued through the interface, whether SAS, SATA, NVMe, or any other. First, a discovery command may allow host 101 to discover the following: (a) that the controller firmware supports the OTP feature; (b) the state of the OTP—programmed or unprogrammed; (c) the current drive program state—security TCG-SED or non-security ISE; and/or (d) if programmed to remain as TCG-SED, how it was programmed.

Second, an OTP security command invokes or sets the OTP feature or selection. Once the OTP security command is executed, secure firmware 206 prevents the drive type from being changed again. Thus, the feature is called OTP or "One-Time Programmable." In some cases, the OTP security command may set the storage device to operate in non-security ISE mode permanently. In other cases, the OTP security command may set the storage device to operate in security TCG-SED mode permanently.

Additionally, or alternatively, instructions stored in secure firmware 206 may allow drive controller 201 to continuously monitor the use of TCG commands by host 101. For example, if host 101 changes the secure identification (SID) personal identification number (PIN) to take ownership of storage device 115, and the OTP security command has not yet been invoked, instructions stored in secure firmware 206 may permanently set the security type to remain as TCG-SED.

In other embodiments, any operation that changes the security state of storage device 115 may be used to indicate that the user intends to use it in security mode (e.g., a revert command). For example, to determine a user's intent to use security features, drive controller 201 may monitor the use of SCSI security protocol in and out commands, or NVMe security receive and security send commands. These features allow increased flexibility in the IHS manufacturer's process by not requiring the OTP be set to TCG-SED until after storage device 115 leaves the factory, thus reducing potential rework.

Figure 3:
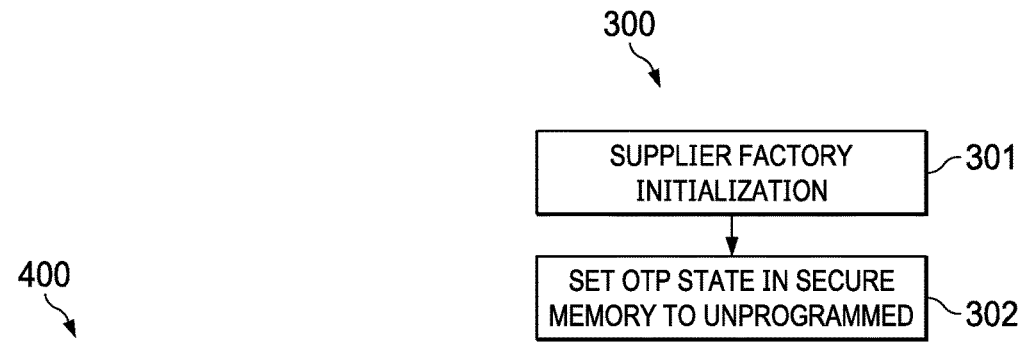
FIG. 3 is a flowchart of an example of a supplier method for setting a one-time programmable (OTP) feature or state of a storage device, according to some embodiments.

FIG. 3 is a flowchart of an example of supplier method 300 for setting a mode of operation or state of a storage device. At block 301, the supplier (e.g., manufacturer, distributor, etc.) of storage device 115 performs a supplier factory initialization procedure. Then, at block 302, the supplier sets the initial OTP state of storage device 115 in secure memory 207 to unprogrammed.

Figure 4:
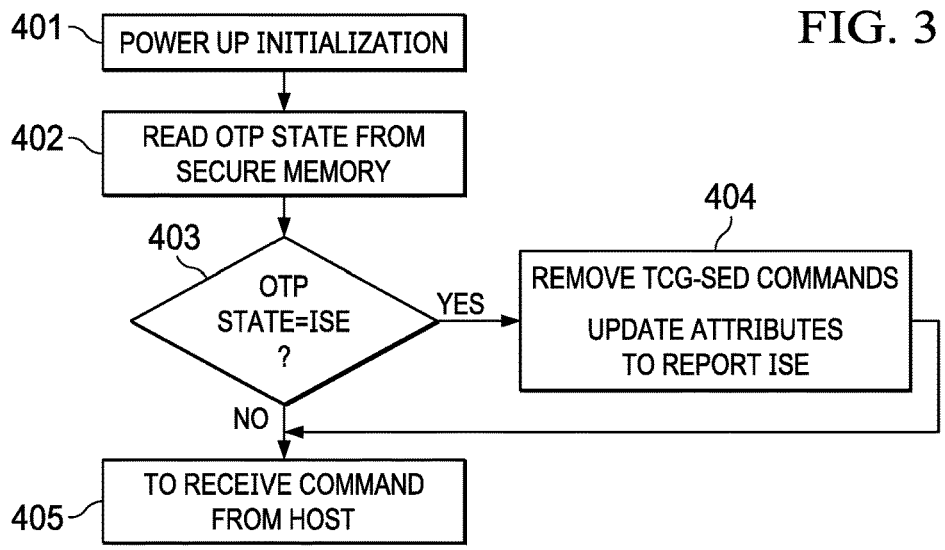
FIG. 4 is a flowchart of an example of a method for operating an OTP security storage device, according to some embodiments.

FIG. 4 is a flowchart of an example of method 400 for operating an OTP security storage device. In various embodiments, method 400 may be performed in part, through the execution of firmware instructions stored in secure firmware 206 by controller 201.

Particularly, after each power-up 401, controller 201 reads the OTP state from secure memory 207 at block 402. If at block 403 method 400 determines that storage device 115 been set to ISE, at block 404 controller 201 removes all TCG-SED functionality from the command set and sets its attributes to report to processor 101 that storage device 115 is an ISE drive.

Figure 5:
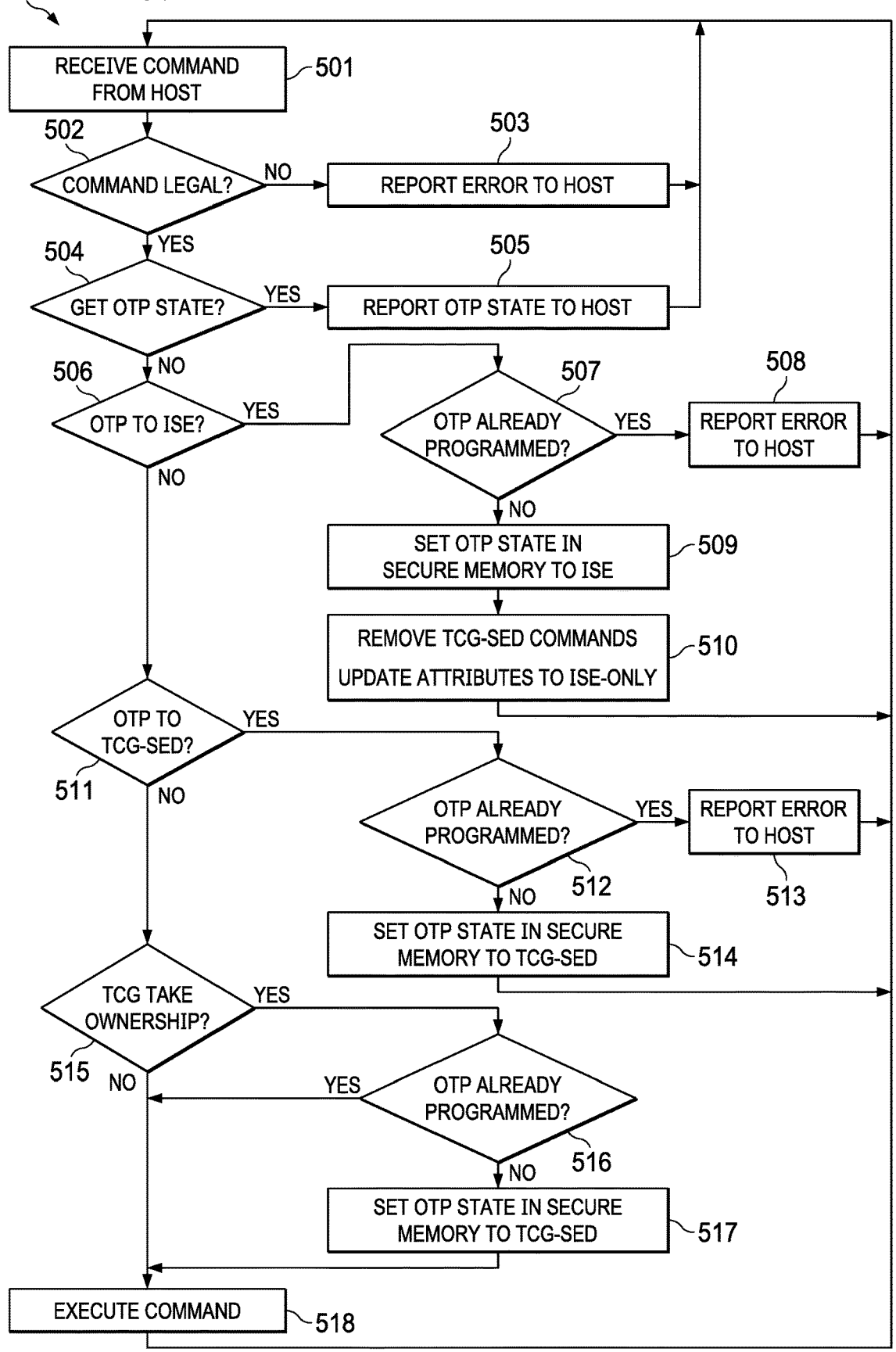
FIG. 5 is a flowchart of an example of a method for processing all commands, including commands attempting to set an OTP security state of a storage device, according to some embodiments.

Conversely, if method 400 determines at block 403 that the OTP state of storage device 115 has not been programmed, or has been set to TCG-SED, block 405 passes control to block 501 of FIG. 5.

FIG. 5 is a flowchart of an example of method 500 for processing all received commands, including commands attempting to set an OTP security state of storage device 115. In various embodiments, method 500 may be performed in part, through the execution of firmware instructions stored in secure firmware 206 by controller 201.

At block 501, controller 201 receives a command from host processor 101. At block 502, method 500 determines whether the command is legal (e.g., found within a valid command set). For example, the command may be illegal if it is a security command when the storage device has been programmed in non-security mode. If not, block 503 reports an error to host processor 101. Otherwise, at block 504, method 500 determines whether the command is a discovery command to get an OTP state. If so, block 505 reports the OTP state to host processor 101, including whether the OTP state was set by an explicit OTP command or by implication upon detecting a security command.

At block 506, method 500 determines whether the command is a command to set the OTP state to ISE. If so, block 507 determines whether the OTP state has already been programmed. If so, block 508 reports an error to host processor 101. Otherwise, at block 509, method 500 sets the OTP state in secure memory 207 to ISE. At block 510, controller 201 removes all TCG-SED functionality from the command set and updates attributes to ISE-only.

At block 511, if storage device 115 receives the program command to set OTP to TCG-SED, block 512 determines whether the OTP state has already been programmed. If so, block 513 reports an error to host processor 101. Otherwise, at block 514, controller 201 sets the OTP state in secure memory 207 to TCG-SED.

Additionally, or alternatively, at block 515, if storage device 115 receives a TCG-SED command to take ownership of device 115 by changing its SID PIN, and block 516 determines that the OTP state has not been previously programmed, then at block 517 controller 201 sets the OTP state in secure memory 207 to TCG-SED.

At block 518, if the command is not of any of the aforementioned types, method 500 executes the command. Once the OTP state has been set to ISE or TCG-SED, further commands to change the OTP state are rejected, and the OTP state is persistent across power cycles. Thus, the security programming is referred to as "One-Time Programmable."

It should be noted that pages in conventional SAS (Serial Attached SCSI) drives may be changed to define certain drive characteristics, and the pages may be saved, making them persistent across power cycles. However, since they can be changed back and forth, they are not one time programmable, or permanent. In contrast, in the systems and methods described herein, TCG-SED security features may be permanently made unavailable to allow import of the storage device into certain regions of the world.

In various embodiments, other characteristics, attributes, or behaviors of a storage device may be stored in a secure memory, that can only be changed from its original state once during the device's lifecycle. The secure memory may be persistent across power cycles and it may be read upon power-up to determine the appropriate characteristic, attribute, or behavior of the storage device. Such a secure memory may be protected from direct writing by a host processor, but its state may be programmed with special commands. Subsequent commands to program the security state of the storage device may be rejected once the device has been programmed.

In some cases, techniques described herein may permanently set the drive type to security TCG-SED, when certain TCG-SED commands are received (e.g., changing an SID PIN, confirming that a TCG-SED drive (not ISE) is required. In other cases, other context information may be used to determine how to process OTP security commands. For example, in some cases an SID PIN change command may be used to set the storage device in security mode in response to the user being in the near-field of IHS 100 (e.g., a opposed to in the mid- or far-fields), in response to the IHS having assumed a particular posture (e.g., as measured by a hinge angle), a lid state, etc.

Although the embodiments described herein read the state of a secure memory and report to a host processor the characteristics of the storage device, in other embodiments a fusible link or other device may be used instead of the secure memory.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a data storage device; and
a memory coupled to the processor, the memory having program instructions stored thereon that, upon execution, cause the IHS to:
initialize the data storage device as a one-time programmable (OTP) security storage device;
transmit a command to the OTP security storage device, wherein the command comprises an instruction to change a secure identification (SID) personal identification number (PIN) of the OTP security storage device, wherein the OTP security storage device is configured to be set in security mode in response to the command comprising the instruction to change the SID PIN of the OTP security storage device, wherein the OTP security storage device is configured to deny or ignore any subsequent command to set the OTP security storage device in a security mode or a non-security mode, wherein to deny or ignore any subsequent command, the OTP security storage device is configured with a secure memory area reserved to indicate whether the OTP security storage device is in the security mode or the non-security mode, wherein an initial OTP security state of the secure memory area is configured by the supplier of the OTP security storage device to an unprogrammed security state; and generate an encrypted locking key to prevent user access to the OTP security storage device, wherein the encrypted locking key is stored in the secured memory area.

2. The IHS of claim 1, wherein the secure memory area is not directly accessible by the processor.

3. The IHS of claim 1, wherein to deny or ignore any subsequent command, the OTP security storage device is configured with one-time fusible link.

4. The IHS of claim 1, wherein the command comprises an instruction to set the OTP security storage device as a Trusted Computing Group Secure Encrypting Drive (TCG-SED) drive.

5. The IHS of claim 1, wherein the command comprises an instruction to change a secure identification (SID) personal identification number (PIN) of the OTP security storage device, and wherein the OTP security storage device is configured to be set in the security mode in response to the command.

6. The IHS of claim 1, wherein the program instructions, upon execution, further cause the IHS to:
transmit a discovery command to the OTP security storage device; and
in response to the transmission, receive: (a) an indication of whether the OTP security storage device supports the security and non-security modes, (b) a current programming state of the OTP security storage device, and (c) a current security state of the OTP security storage device.

7. The IHS of claim 6, wherein the program instructions, upon execution, further cause the IHS to, in response to the transmission, receive: (d) an indication of how the OTP security storage device was programmed.

8. A memory storage device having program instructions stored thereon that, upon execution by a controller of a one-time programmable (OTP) security storage device, wherein the OTP security storage device comprises a data storage device configured with a secure memory area reserved to indicate whether the data storage device is in security or non-security mode, cause the OTP security storage device to:
receive a command from an Information Handling System (IHS), wherein the command comprises an instruction to change a secure identification (SID) personal identification number (PIN) of the OTP security storage device, and wherein the SID PIN change is based on context information determined by sensors coupled to the IHS, wherein the context information for the SID PIN change comprises at least one of: a distance between a user of the IHS and the IHS, a posture of the IHS, or a lid state of the IHS; and enter a security mode in response to the command comprising the instruction to change the SID PIN of the OTP security storage device.

9. The memory storage device of claim 8, wherein the program instructions, upon execution by the controller, further cause the OTP security storage device to deny or ignore any subsequent command to set the OTP security storage device in security or non-security mode.

10. The memory storage device of claim 8, wherein the secure memory area is not directly accessible by a processor of the IHS.

11. The memory storage device of claim 8, wherein the command comprises an instruction to set the OTP security storage device as a Trusted Computing Group Secure Encrypting Drive (TCG-SED) drive.

12. The memory storage device of claim 8, wherein the program instructions, upon execution, further cause the OTP security storage device to:
receive a discovery command from the IHS; and
in response to the discovery command, transmit to the IHS: (a) an indication of whether the OTP security storage device supports the security and non-security modes, (b) a current programming state of the OTP security storage device, (c) a current security state of the OTP security storage device, and (d) an indication of how the OTP security storage device was programmed.

13. A method, comprising:
determining, by a drive controller, that a data storage device coupled to the drive controller is not programmed to operate in a mode of operation, wherein the data storage device is configured with a secure memory area reserved to indicate the mode of operation;
receiving, at the drive controller, a command issued by a processor of an Information Handling System (IHS);
in response to: (a) determining that the data storage device has not been programmed to operate in the mode of operation, and (b) receiving the command, permanently removing all Trusted Computer Group Secure Encrypting Drive (TCG-SED) commands from a list of commands processable-by the drive controller, and setting the data storage device in a non-security mode of operation; and
automatically denying or ignoring any subsequent command to set the data storage device in a different mode operation.

14. The method of claim 13, further comprising, prior to setting the data storage device in the mode of operation, determining that the command indicates a user's intent to set the data storage device in the mode of operation.

15. The method of claim 13, further comprising:
receiving a discovery command from the IHS; and
in response to the discovery command, transmitting to the IHS at least one of: (a) an indication of whether the data storage device supports the mode and the other mode, (b) a current mode of the data storage device, or (c) an indication of how the data storage device was programmed.

* * * * *